US012608263B2

(12) United States Patent
Lucero et al.

(10) Patent No.: US 12,608,263 B2
(45) Date of Patent: Apr. 21, 2026

(54) POWER STATE FRAMEWORK

(71) Applicant: Microsoft Technology Licensing, LLC, Redmond, WA (US)

(72) Inventors: James Christopher Lucero, Seattle, WA (US); Jonathan Michael Blair, Seattle, WA (US); Bradley Robert Martin, Snohomish, WA (US); Rathi Kartheek, Cupertino, CA (US); Miguel A. Claudio, Redmond, WA (US); Al Zarko, Monroe, WA (US); Alexei Aleksenko, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 20 days.

(21) Appl. No.: 18/673,040

(22) Filed: May 23, 2024

(65) Prior Publication Data

US 2025/0362993 A1     Nov. 27, 2025

(51) Int. Cl.
G06F 11/07          (2006.01)
G06F 1/3215         (2019.01)

(52) U.S. Cl.
CPC ........ G06F 11/0781 (2013.01); G06F 1/3215 (2013.01); G06F 11/0751 (2013.01); G06F 2201/86 (2013.01)

(58) Field of Classification Search
CPC ............. G06F 11/0781; G06F 11/0751; G06F 2211/1071; G06F 1/3215; G06F 1/30
USPC ................................................ 714/48, 37, 22
See application file for complete search history.

(56) References Cited

U.S. PATENT DOCUMENTS

| | | | |
|---|---|---|---|
| 10,002,212 B2 | 6/2018 | Brock | |
| 2007/0150760 A1* | 6/2007 | Nowlin ................. | G06F 1/3203 |
| | | | 713/300 |
| 2007/0283187 A1* | 12/2007 | Dunstan .............. | G06F 11/0793 |
| | | | 714/24 |
| 2013/0297280 A1 | 11/2013 | Feng | |
| 2021/0397476 A1 | 12/2021 | Liu | |

(Continued)

OTHER PUBLICATIONS

Extended European Search Report Received in European Patent Application No. 25176626.7, mailed on Oct. 17, 2025, 10 pages.

*Primary Examiner* — Chae M Ko
(74) *Attorney, Agent, or Firm* — Weaver IP L.L.C.

(57)          ABSTRACT

A power state framework executes a workload in supported computing device types and configurations during a sequence of power state transitions to simulate user experiences. Workloads can be combined, e.g., default workload plus add-on workload(s). Device states are monitored, collected, reported, and analyzed to identify faults, which are prioritized for repair, e.g., based on the projected impact of the faults on users, e.g., if the users were to experience the faults. Computing device states include states of attached peripheral devices and wireless or wired connectivity before and after power state transitions. Device state indicates device stability throughout supported device power state transitions. Devices under test can be on debuggers during execution of workload and power state transitions. Automated, accelerated simulation of the execution of end user workloads and power state transitions in actual computing devices saves time and avoids replication errors compared to manual user-driven device testing.

20 Claims, 5 Drawing Sheets

(56)         References Cited

U.S. PATENT DOCUMENTS

| 2022/0011842 A1* | 1/2022 | Reddy | G06F 11/0793 |
| 2022/0187893 A1 | 6/2022 | Sakarda | |
| 2023/0041479 A1* | 2/2023 | Agarwal | A61B 90/50 |
| 2023/0093974 A1 | 3/2023 | Tan | |

* cited by examiner

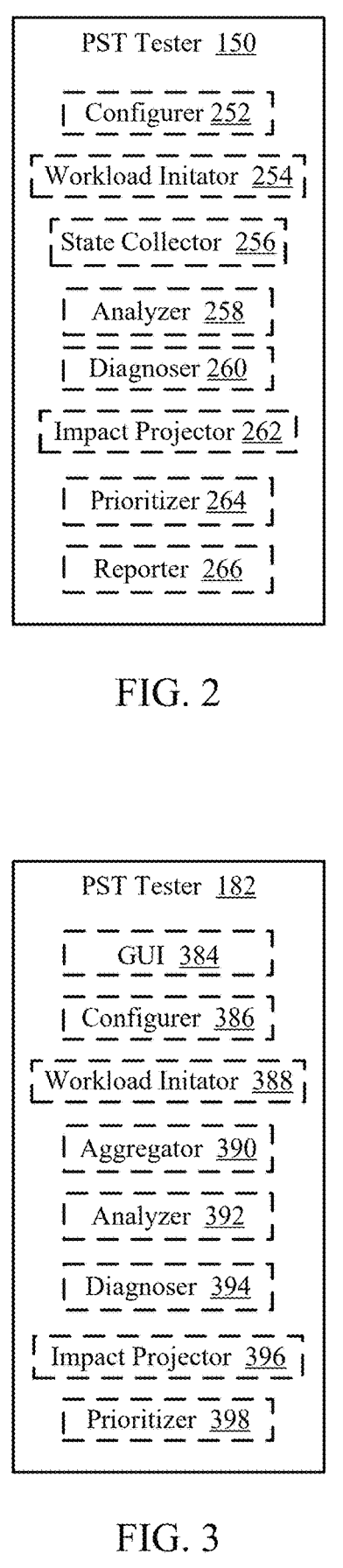

PST Tester 150

Configurer 252

Workload Initator 254

State Collector 256

Analyzer 258

Diagnoser 260

Impact Projector 262

Prioritizer 264

Reporter 266

FIG. 2

PST Tester 182

GUI 384

Configurer 386

Workload Initator 388

Aggregator 390

Analyzer 392

Diagnoser 394

Impact Projector 396

Prioritizer 398

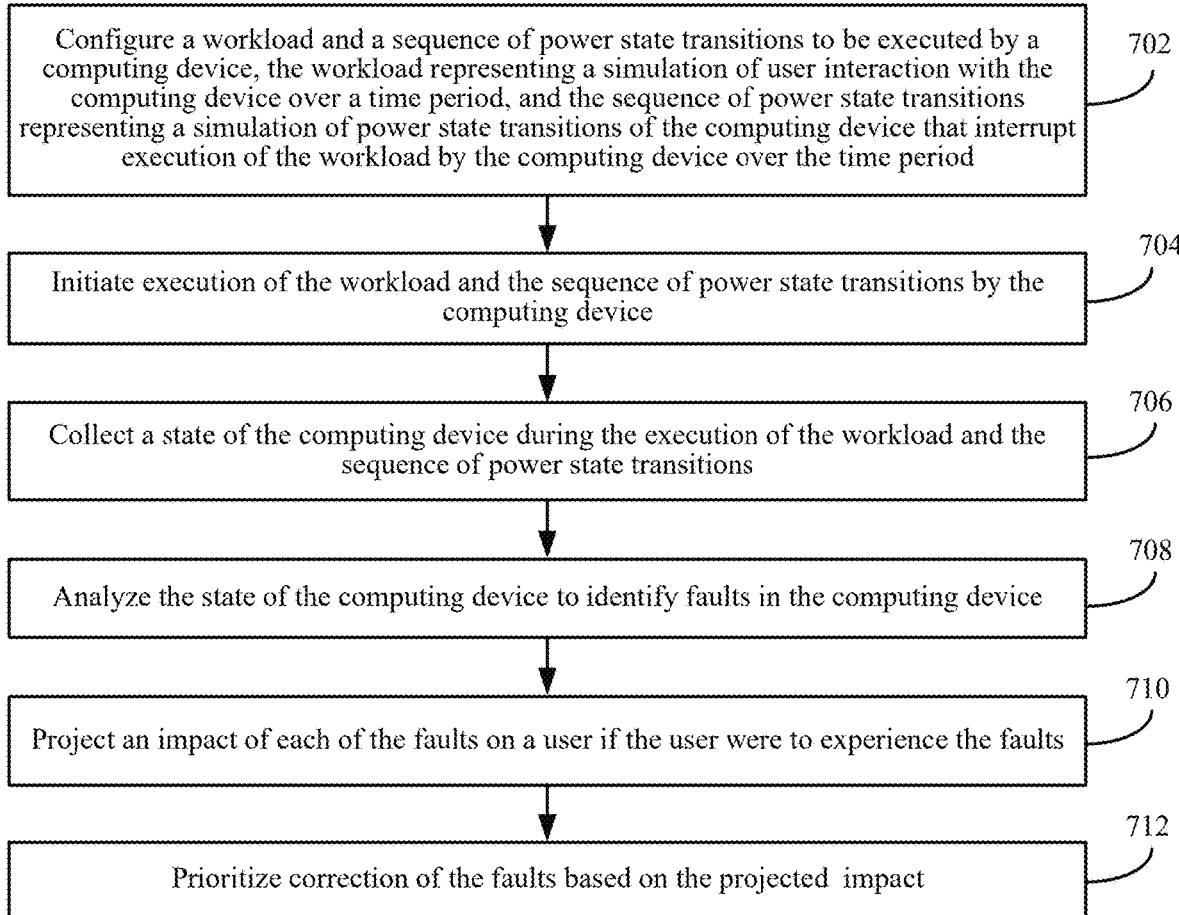

| | |
|---|---|
| Configure a workload and a sequence of power state transitions to be executed by a computing device, the workload representing a simulation of user interaction with the computing device over a time period, and the sequence of power state transitions representing a simulation of power state transitions of the computing device that interrupt execution of the workload by the computing device over the time period | 702 |
| Initiate execution of the workload and the sequence of power state transitions by the computing device | 704 |
| Collect a state of the computing device during the execution of the workload and the sequence of power state transitions | 706 |
| Analyze the state of the computing device to identify faults in the computing device | 708 |
| Project an impact of each of the faults on a user if the user were to experience the faults | 710 |
| Prioritize correction of the faults based on the projected impact | 712 |

FIG. 7

POWER STATE FRAMEWORK

BACKGROUND

Computing systems and their applications are manually tested by users according to real-world user-experiences to identify as many failures as possible and perform corresponding repairs prior to full release to consumers. Companies often purchase and take delivery of computing devices based on specifications prior to such testing or otherwise using the computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for a power state framework that executes a configured workload in a variety of supported computing device types and configurations during a configured sequence of power state transitions to simulate user experiences. The workload and power transitions are implemented on one or more devices serially, concurrently, locally, remotely, in the same or different locations. States of each device are monitored, collected, reported, and analyzed to identify faults, which are prioritized for repair, for example, based on the projected impact of the faults on users. Automated, accelerated simulation of the execution of end user workloads and power state transitions in actual computing devices saves time and avoids replication errors compared to manual human driven device testing. Automated (e.g., remote, customizable) testing can provide confirmation of performance and compatibility prior to computing device procurement.

In one aspect, a computing device comprises a workload initiator configured to initiate execution of a workload by a computing device under test (DUT), the workload representing a simulation of user interaction with the DUT over a time period. A power state transitioner of the computing device is configured to initiate execution of a sequence of power state transitions by the DUT during the execution of the workload by the DUT. The power state transitions represent a simulation of power state transitions of the DUT that interrupt the execution of the workload over the time period. A state collector of the computing device is configured to collect a state of the DUT during the execution of the workload and the sequence of power state transitions. An analyzer of the computing device is configured to analyze the state of the DUT to identify faults in the DUT. A reporter of the computing device is configured to report the faults for correction.

In another aspect, a method comprises configuring a workload and a sequence of power state transitions to be executed by a computing device, the workload representing a simulation of user interaction with the computing device over a time period, and the sequence of power state transitions representing a simulation of power state transitions of the computing device that interrupt execution of the workload by the computing device over the time period; initiating execution of the workload and the sequence of power state transitions by the computing device; collecting a state of the computing device during the execution of the workload and the sequence of power state transitions; analyzing the state of the computing device to identify faults in the computing device; projecting an impact of each of the faults on a user if the user were to experience the faults; and prioritizing correction of the faults based on the projected impact.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a block diagram of an example of components of a power state framework that may be executed by a device under test, according to an embodiment.

FIG. 3 shows a block diagram of an example of components of a power state framework that may be executed by a server, according to an embodiment.

FIG. 7 shows a flowchart of an example method implementing a power state framework, according to an embodiment.

Figure 1:
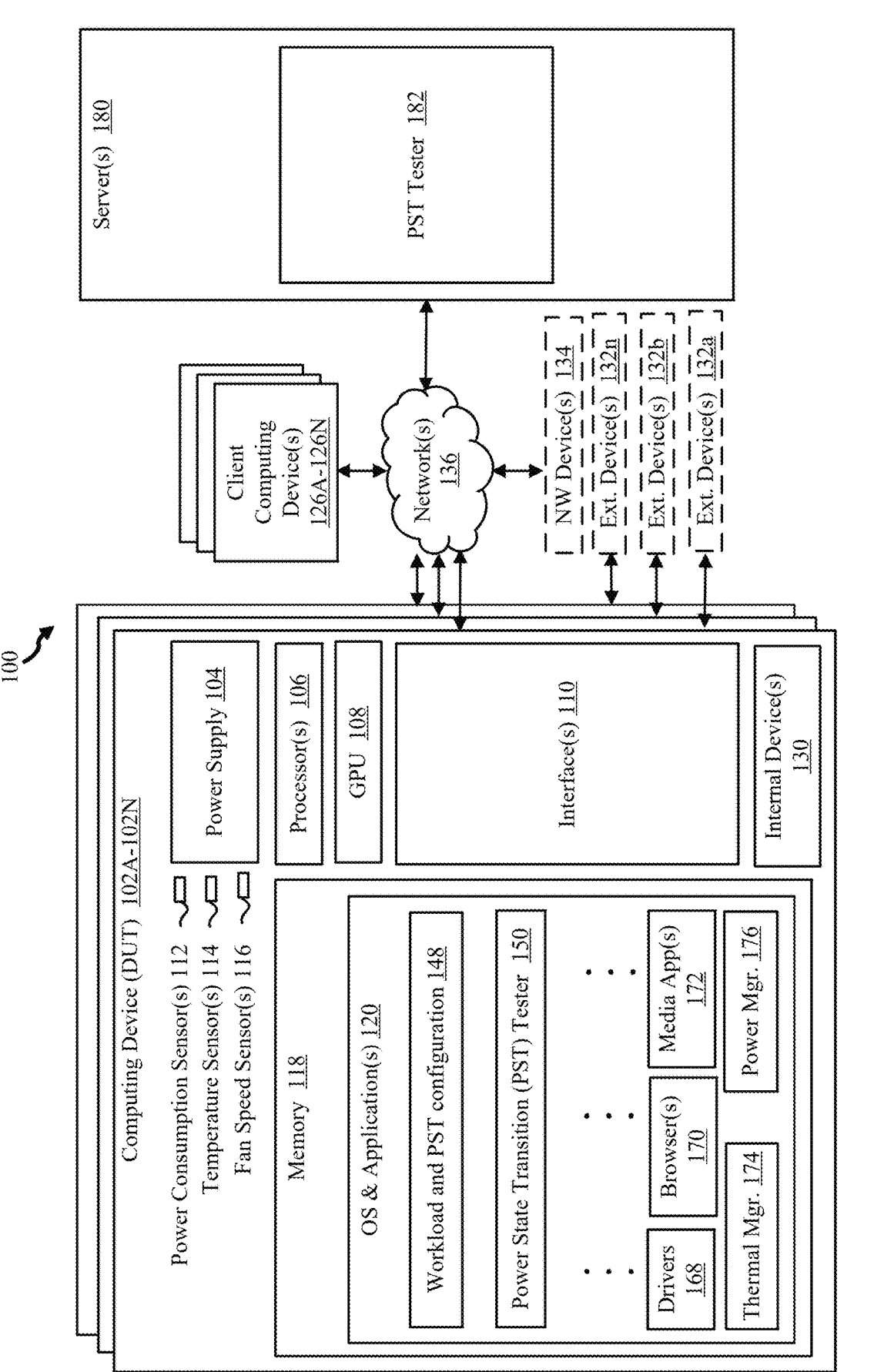
FIG. 1 shows a block diagram of an example computing environment for a power state framework, according to an embodiment.

The features and advantages of the present application will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Computing systems, including the operating systems and applications executed thereby, are manually tested by users to determine real-world user-experiences, and thereby identify and repair the cause of as many types of failure as possible prior to full release to consumers. However, manual testing is time-consuming and prone to replication errors.

Businesses often purchase and take delivery of computing devices based on specifications prior to testing or otherwise using the computing devices. Performance and/or compatibility issues may arise after investing considerable time and expense in such bulk purchases. For example, a business may discover that the hardware, firmware, or software of a computing system performs poorly with one or more business applications.

Methods, systems and computer program products are provided for a power state framework that executes a configured workload in a variety of supported computing device types and configurations during a configured sequence of power state transitions to simulate user experiences. Workloads can be combined, such as a default workload combined with an add-on custom workload. The automated workloads and power transitions are implemented on one or more devices serially, concurrently, locally, remotely, in the same or different locations. States of each device are monitored, collected, reported, and analyzed to identify faults, which are prioritized for repair, for example, based on the projected impact of the faults on users, e.g., if the users were to experience the faults. The state of the computing device includes states of attached peripheral devices and wireless or wired connectivity before and after power state transitions. Device states indicate device stability throughout supported device power state transitions. Devices under test can be on debuggers during execution of workload and power state transitions, which enables capture of many device signals, which may then be analyzed to determine device faults. Automated, accelerated simulation of the execution of end user workloads and power state transitions in actual computing devices saves time and avoids replication errors compared to manual human driven device testing. Automated (e.g., remote, customizable) testing can provide parties interested in computing devices with confirmation of performance and compatibility prior to computing device procurement.

These and further embodiments may be configured in various ways and implemented in a variety of systems/ environments. For example, FIG. 1 shows a block diagram of an example computing environment 100 for a power state framework, according to an embodiment. Example computing environment 100 presents one of many possible examples of computing environments. As shown in FIG. 1, computing environment 100 includes a plurality of computing devices (also referred to as devices under test (DUT)) 102A-102N, one or more client computing devices 126A-126N, one or more servers 180, Each of computing devices 102A-102N includes a power supply 104, one or more processors 106, a graphics processing unit (GPU) 108, one or more interfaces 110, one or more power consumption sensors 112, one or more temperature sensors 114, one or more fan speed sensors 116, memory 118, one or more internal devices 130, a corresponding set of external devices 132A-132N, and one or more network (NW) devices 134. One or more of server(s) 180 include a power state transition (PST) tester 182. Memory 118 stores, for loading and execution, operating system (OS) and application(s) 120, which includes a workload and PST configuration 148, a PST tester 150, one or more drivers 168, one or more browsers 170, one or more media applications 172, a thermal manager 174, and a power manager 176. These components of environment 100 are described in further detail as follows.

Computing environment 100 is any computing environment (e.g., any combination of hardware, software, and firmware), including internal and external coupled devices. For example, computing device(s) 102 may or may not be communicatively coupled to one or more other devices, such as network (NW) device(s) 138 and/or external device(s) 140A-N.

Note that any number of one or more of computing devices 102 are present in embodiments. Each present computing device 102A-102N has a device type among multiple types of supported device types (e.g., form factors), such as cellular phone, tablet, notebook, desktop, etc. For example, each computing device 102 may be any type of stationary or mobile computing device, including a mobile computer or mobile computing device (e.g., a personal digital assistant (PDA), a laptop computer, a notebook computer, a tablet computer, a netbook, etc.), a mobile phone, a wearable computing device, or other type of mobile device, or a stationary computing device such as a desktop computer or PC (personal computer), or a server. Each computing device 102A-102N has a configuration among multiple supported configurations (e.g., hardware, firmware, software, connected devices, network connections, and so on).

Computing device(s) 102A-102N may be coupled to other computing devices, such as client computing device(s) 126A-126N and/or server(s) 180, for example, via network(s) 136.

Each client computing device 126 may be any type of stationary or mobile computing device, including a mobile computer or mobile computing device (e.g., a personal digital assistant (PDA), a laptop computer, a notebook computer, a tablet computer, a netbook, etc.), a mobile phone, a wearable computing device, or other type of mobile device, or a stationary computing device such as a desktop computer or PC (personal computer), or a server.

Each server 180 may be any type of stationary or mobile computing device, including a mobile computer or mobile computing device (e.g., a personal digital assistant (PDA), a laptop computer, a notebook computer, a tablet computer, a netbook, etc.), a mobile phone, a wearable computing device, or other type of mobile device, or a stationary computing device such as a desktop computer or PC (personal computer), or a server.

Figure 6:
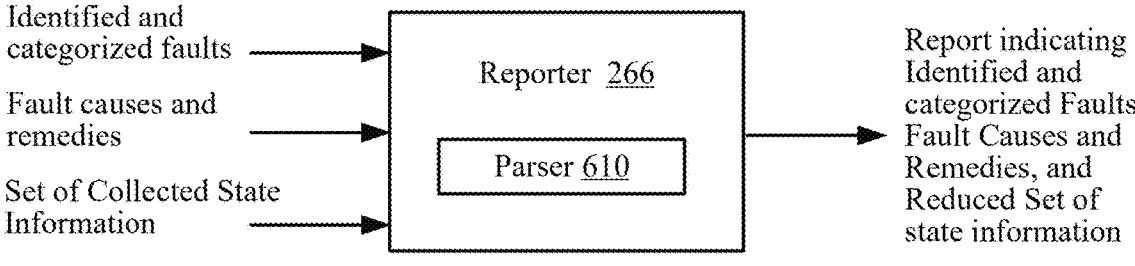
FIG. 6 illustrates a block diagram showing an example of parsing information for a report, according to an embodiment.

An example of computing device 102, client computing device(s) 126A-126N, and server(s) 180 is shown in FIG. 6. FIG. 6 shows an example of components in a computing device 102 and server 180. Computing device 102 and server 180 show only selected computing components for clarity.

Power supply 104 can include any type of power source, such as an AC to DC converter and/or a battery. Power supply 104 supplies power to some or all internal and external components and devices associated with computing device 102. Power supply 104 may be controlled by power manager 174.

Power consumption sensor(s) 112 include one or more components and/or system load or power sensors (e.g., CPU load sensor, GPU load sensor, system load sensor). Power consumption sensor(s) 112 directly or indirectly detect power consumption. Power consumption sensor(s) 112 may be associated with hardware, firmware and/or software. For example, software may perform calculations on detected voltages, clock frequencies, and/or other indications of loading to calculate/determine (e.g., estimate) power consumption.

Temperature sensor(s) 114 include one or more temperature sensors, which may be placed on or near one or more components in computing device 102. For example, there may be a CPU temperature sensor, a GPU temperature sensor, a power supply temperature sensor, etc. Temperature sensor(s) 114 may include one or more types of sensors, such as thermocouples, thermistors, semiconductors, etc.

Fan speed sensor(s) 116 detect a control signal or operating speed of a fan (e.g., an active heat dissipater). Fan speed sensor(s) 116 may be associated with hardware, firmware and/or software.

Processor(s) 106 execute program code stored in a computer readable medium (e.g., memory 118), such as program code of operating systems and applications 120. Processor(s) 106 include any type of processing unit. Processor 106 may be, for example, a central processing unit (CPU), a microcontroller, a microprocessor, and/or other physical hardware processor circuit. Processor(s) 106 executes one or more processes in one or more computing environments. A process is an instance of any type of executable (e.g., binary, program, application) that is being executed by processor(s) 106. A process executed by processor(s) 106 include(s) power state transition tester 150, or a variant thereof, such as an agent for PST tester 182.

GPU 108 is a graphics processing unit configured to process graphics and render video to one or more display components or devices. GPU 108 may be separate from or integrated with processor(s) 106 (e.g., on a board/card).

Interface(s) 110 include all types of interfaces between internal and external components and devices, such as wired and wireless communication interfaces associated with computing device 102 that communicatively couple internal components, internal devices 130, external devices 132, network(s) 136, NW device(s) 138, etc.

Internal device(s) 130 include devices integrated in computing device 102, such as internal user interface devices (e.g., touchpads, keyboards, touch screens, display screens, pointing devices, storage devices, game controllers, speakers), cameras, active heat dissipation devices (e.g., fans, coolant pumps and radiators), and so on.

External device(s) 132 include devices external to computing device 102, such as removable external user interface devices (e.g., touchpads, keyboards, touch screens, pointing devices, storage devices, display screens, game controllers, speakers), portable storage devices, cameras, and so on. External device(s) 130 can be collocated with computing device 102 or remote.

Network (NW) device(s) 134 include devices external to computing device 102, such as removable external user interface devices (e.g., touchpads, keyboards, touch screens, pointing devices, storage devices, display screens, game controllers, speakers), portable storage devices, cameras, and so on. NW device(s) 134 can be collocated with computing device 102 or remote.

For example, internal devices 130, external device(s) 132, and/or NW device(s) 134 can include user interfaces, such as one or more of a pointing device (e.g., mouse, pen), a typing device (e.g., keyboard), speakers, microphone, printer, display (e.g., touchscreen), graphical user interface (GUI) generated by executed computer-executable instructions and displayed by a display, etc. For example, an OS and/or application 120 executed by processor(s) 106 can be configured to generate a GUI for a user (e.g., an administrator (admin)) to interact with power state transition (PST) tester 150.

Computing device(s) 102A-102N can be coupled to one or more networks (e.g., network(s) 136) via interface(s) 110. Communication network(s) 136 may include one or more public access and/or restricted (e.g., private) access networks, which may be wired and/or wireless. Communication network(s) 136 may include, for example, one or more of any of a local area network (LAN), a wide area network (WAN), a personal area network (PAN), a combination of communication networks, such as the Internet, and/or a virtual network. In example implementations, each computing device 102 and one or more other devices, such as local and/or remote NW device(s) 134, may be communicatively coupled via communication network(s) 136. In an implementation, each computing device 102 and one or more other devices, such as NW device(s) 136, communicate via one or more application programming interfaces (APIs), and/or according to other interfaces and/or techniques. Computing device 102 and one or more other devices, such as NW device(s) 136, may include one or more network interfaces that enable communications between devices. Examples of such a network interface, wired or wireless, may include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Memory 118 includes one or more types of memory, such as read only memory (ROM) 608 and random-access memory (RAM) 610. Drivers 168 (e.g., device drivers executed by processor(s) 106) manage (e.g., control) devices attached (e.g., internally or externally) to computing device 102. Drivers 168 enable internal devices 130 and external devices 132A-N to communicate with operating system and applications 120. PST tester 150 may monitor, collect, and use the states of drivers 168 to identify the cause of faults in the operation of computing device 102.

Browser(s) 170 include one or more applications used to access and browse websites and web applications on the world wide web. Browser(s) 170 process requests to view (and interact with) web pages from websites/webapps (e.g., shopping/retail stores, search engines, news, social media, video streaming, email, word processing, games, banking, and so on). Browser(s) 170 retrieve website/webapp content (e.g., files) from web servers. The content (e.g., audio, text, images, video) is presented by computing device 102 using one or more internal devices 130 and/or external device(s) 132 (e.g., display, speaker(s)).

Media application(s) 172 include all types of applications, such as web-based applications (Webapps), mobile applications, desktop/laptop applications, etc. Web-based applications are programs stored on a remote server that are provided to computing device 102 via a browser application. A mobile application is an application that is downloaded to run on a mobile device without a necessity for presentation via a browser application. Many businesses, such as streaming services, provide Webapp and mobile app versions of their products.

Thermal manager 174 is configured to monitor temperatures inside and/or outside computing device(s) 102, such as temperatures at passive and/or active heat dissipation devices (e.g., fans, heatsinks). Thermal manager 174 can use sensor data to determine control settings for devices (e.g., fan speed). For example, thermal manager 174 may receive and use temperature data from temp sensor(s) 114, power consumption data from power consumption sensor(s) 112, and fan speed data from fan speed sensor(s) 116 to control signals provided to fans, heat pumps circulating coolant, processor(s) 106, GPU 108, etc. Thermal manager 174 can control fans to operate at one or more discrete/fixed speeds or continuously variable speeds. PST tester 150 may collect/use thermal management information to determine the cause of faults that occur in the operation of computing device(s) 102.

Power manager 176 manages power state transitions of computing device 102 as a system and/or for various components and/or devices attached thereto. Power manager 174 and associated power states may vary among devices, e.g., based on the types of devices. For example, a mobile phone may have a different operating system and/or power states than a desktop computing device. In examples, power manager 176 may transition computing device 102 (e.g., or one or more components and/or devices) between available/supported power states.

Power states may include, for example, a full on (ON) power active state, connected standby (CS) state, a standby sleep state, a disconnected standby (DS) state, a low power sleep state, a hibernate state, an adaptive hibernate state, a soft OFF state, a mechanical full power shut down OFF state, a restart state, and so on.

A CS state may include modern standby with networking enabled, which may be different from a sleep state, which is a generic low power state. In PST testing, a CS state may be a low power state achieved by pressing the power button. A DS state may include modern standby with networking disabled. A hibernate state may be a suspended power state used by an operating system. In some examples, a transition into hibernate state may occur directly from an active OS state. An adaptive hibernate state may be a power state that refers to a hibernate session that was reached by going through CS and then (e.g., naturally, via a timeout) transitioning to hibernate.

Workload and PST configuration 148 specifies a sequence of user-simulated operations to be executed by a computing device 102 interspersed with a sequence of power state transitions to be executed by computing device 102. Workload and PST configuration 148 may be created, downloaded, etc., for example, using PST tester 150 and/or PST tester 182.

PST testers 150 and 182 are test tools configured to evaluate the stability of computing devices 102A-102N to perform a workload through supported power state transitions, as indicated by workload and PST configuration 148. PST testers 150 and 182 are configured to test any device that supports power state transitions with multiple states (e.g., beyond simply on/off) to simulate (e.g., anticipated) power state changes while processing a scheduled pattern of user-simulated operations to project the type and frequency of failures a user could experience over a time period (e.g., two weeks). For example, a company developing computing device(s) 102, developing devices or software for computing device(s) 102, and/or interested in using or purchasing computing device(s) 102 could run PST tester 150 and/or PST tester 182 on a set of thirty computing devices 102A-102N to test performance, compatibility, etc. prior to product release or purchase.

Note that one or both of PST testers 150 and 182 may be present in embodiments. For instance, in one embodiment, PST tester 150 is present (and PST tester 182 not present) to perform the PST test functionality described herein directly on one or more of computing devices 102A-102N (e.g., using processor(s) 106 etc.), which enables local testing to be performed without the need for communications over network(s) 136 from PST tester 182. Alternatively, PST tester 182 is present (and PST tester 150 not present) to perform the PST test functionality described herein in one or more of servers 180, which has the benefit of using potentially greater processing and storage resources of server(s) 180 (e.g., operation in a cloud platform, such as further described below with respect to FIG. 8). In another embodiment, both of PST testers 150 and 182 are present to perform the PST functionality described herein, with the advantage of being able share and/or split the various functions with a first portion of processing performed locally (on one or more of computing devices 102A-102N) and a second portion of processing performed remotely (on one or more of servers 180) in a manner that leverages processing power, storage capacity, and/or network capacity to improve overall efficiency. Furthermore, an instance of PST testers 150 and/or 182 as disclosed herein may perform PST functionality with respect to a single computing device 102 or for multiple computing devices 102A-102N.

Accordingly, FIG. 1 shows multiple possible implementations of a PST tester. Computing device(s) 102 include one or more operating systems and applications 120, virtual machines (VMs), etc., which may be executed (e.g., by processor(s) 106), hosted, and/or stored therein (e.g., in memory 118) or via one or more other computing devices (e.g., NW device(s) 134, external device(s) 132A-N, server(s) 180) via network(s) 136). And the PST tester, in full or in part, may be stored and executed on computing device(s) 102A-102N (e.g., as indicated by PST tester 150) and/or on server(s) 180 (e.g., as indicated by PST tester 182). As such, PST testers 150 and 182 provide for a high level of customization via configuration options and extensions.

PST tester 150 and PST tester 182 may include one or more components configurable to test the operation of computing device 102 using a workload and a sequence of power state transitions. Examples of such embodiments are further described with respect to FIGS. 2 and 3. In particular, FIG. 2 shows a block diagram of example components of PST tester 150 that may be executed by a device under test, according to an embodiment. As shown in FIG. 2, PST tester 150 includes a configurer 252, a workload initiator 254, a state collector 256, an analyzer 258, a diagnoser 260, an impact projector 262, a prioritizer 264, and a reporter 266. Furthermore, FIG. 3 shows a block diagram of an example of components of a power state framework that may be executed by a server, according to an embodiment. PST tester 182 includes a GUI 384, a configurer 386, a workload initiator 388, an aggregator 390, an analyzer 392, a diagnoser 394, an impact projector 396, and a prioritizer 398, which may function similar to their respective counterparts in PST tester 150. In FIGS. 2 and 3, dashed lines indicate that components may or may not be present, may be merged with other components, or may be implemented elsewhere (e.g., in server(s) 180). These components of PST tester 150 and PST tester 182 are described in further detail as follows.

Note that one or both of configurer 252 and configurer 386 may be present in embodiments. When present, configurer 252 and/or configurer 386 is/are configured to configure computing device(s) 102A-102N with a workload and a sequence of power state transitions based, at least in part, on at least one of a type of computing device 102 (e.g., a DUT type) among a plurality of supported device types or a configuration of computing device 102 among a plurality of supported configurations. For example, configurer 252 and/ or 386 may be used to select, edit, create, or customize workload and PST configuration 148. In examples, a workload is a sequence of operations (e.g., streaming media operations) indicating user interaction with computing device 102. For example, a workload can instruct computing device 102 to open one or multiple media applications 172 simultaneously, access content on computing device 102 or on a content server (e.g., a video content streamer), play the content, fast forward the content, stop the content, and so on, all while one or more power state transitions occur to interrupt and resume the workload. In one example, the sequence of power state transitions for a DUT may be ordered in a typical boot up sequence or other usual operational sequence for the DUT so as simulate normal operating conditions for the DUT. In another example, the power state transitions for a DUT may be sequenced out of usual order, which may better challenge DUT operational tolerances and thereby root out failure conditions that would not be ordinarily apparent.

In examples, the workload is configured with at least one halt on fail trigger to stop execution of the workload upon detection of one or more types of faults by the analyzer 258 and/or analyzer 392. Such stoppage based on a halt on fail trigger enables troubleshooting to be performed without having to wait for further workload operations. In examples, the workload can include separate combined workloads, such as a default workload combined with one or more customized or add-on workloads. Merging different types of workloads to form a workload has benefits, such as streamlining the sequence of operations to focus on operations of importance/interest of the workloads rather than having to sequence through all their operations, forming unusual combinations of operations so as to challenge operational tolerances, etc.

One or both of initiator 254 and 388 may be present in embodiments. When present, initiator 254 and/or initiator 388 is/are a workload and power state transition initiator configured to initiate execution of a configured workload by each respective computing device 102A-102N (e.g., device(s) under test (DUT(s))) during execution of a configured sequence of power state transitions. The workload represents a simulation of user interaction with computing device 102 over a time period. The power state transitions represent a simulation of power state transitions of computing device 102 that interrupt the execution of the workload over the time period. In some examples, computing device 102 is on a debugger during execution of the workload and power state transitions. In some examples, initiator 254 and/or initiator 388 includes a subsystem engager configured to provide a system load to engage subsystem components in computing device 102.

Collector 256 is a state collector configured to collect a state of computing device 102 during the execution of the workload and the sequence of power state transitions. In examples, the state of the computing device includes states of peripheral devices attached to computing device 102 (e.g., external device(s) 132) and connectivity of computing device 102 (e.g., connectivity to network(s) 136) via interface(s) 110 before and after at least one of the power state transitions. Testing in the situation of a peripheral device coupled to computing device 102 has benefits, including detecting conditions related to the peripheral device that can cause problems with the operation of computing device 102. Collector 256 can collect states indicating abnormal shutdown detection and analysis, disk corruption checking, crash detection, and so on. Data collection may vary based on the workload, and testing information sought. For example, testing may pertain to storage evaluation, radio frequency (RF) testing, and so on. For example, RF testing may perform a workload that connects to an access point (AP), a power state may be reduced to low power and then wake up, collecting the state of the AP connection before and after the state transitions, e.g., to determine if the computing device maintained or restored a connection to the AP. Note that in an embodiment, a collector 256 may additionally or alternatively be present at PST tester 182 of FIG. 3.

One or both of analyzer 258 and analyzer 392 may be present in embodiments. When present, analyzer 258 and/or analyzer 392 is/are configured to analyze the state of computing device 102 collected by state collector 256 to identify faults (e.g., failure events, unexpected events) in the operation of computing device 102. In examples, analyzer 258 and/or analyzer 392 is/are configured to analyze the state of computing device 102 in aggregation to identify and/or categorize faults. For example, analyzer 258 and/or analyzer 392 may use (e.g., all) state information generated by computing device 102 to identify faults. Analyzer 258 and/or analyzer 392 may search for and identify failures across all subsystems, e.g., faults, crashes, hanged/missing devices, hardware faults (e.g., in Silicon), thermal/fan control/performance, and so on.

Figure 4:
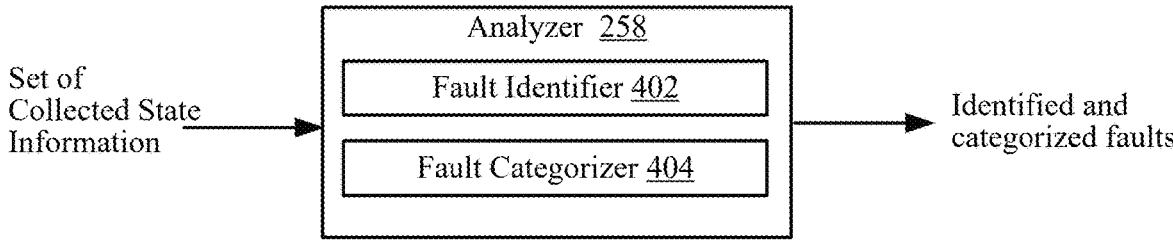
FIG. 4 illustrates a block diagram showing an example of a fault analyzer, according to an embodiment.

FIG. 4 illustrates a block diagram showing an example of analyzer 258 of FIG. 2, according to an example embodiment. Note that analyzer 392 of FIG. 3 may be similarly configured to analyzer 258 of FIG. 4. As shown by example in FIG. 4, analyzer 258 includes a fault identifier 402 and a fault categorizer 404. Fault identifier 402 is configured to identify faults in the set of collected state information. Fault categorizer 404 is configured to categorize the identified faults. Types of faults may be configurable. Types of faults/ failures/unexpected events include, for example, one or more of the following: CrashEvent (e.g., event to log any type of ABS); BangedDevice (e.g., records a banged device from device manager); MissingDevice (e.g., records a missing device from device manager); SWDripsFailure (e.g., indicates SW Drips was below <SWDripsMin>); HWDrips-Failure (e.g., indicates HW Drips was below <HWD-ripsMin>); EventMissingFailure (e.g., expected session was not found in sleepstudy); DurationFailure (e.g., low power state duration did match expected duration); PingFailure (e.g., ping test failed after resume from power state); PowerDrainFailure (e.g., battery drain was observed when system was plugged into AC); InformationEvent (e.g., non-error informative item); and/or UserAppEvent (e.g., error or information reported by a UserApp).

With reference back to FIGS. 2 and 3, one or both of diagnoser 260 and 394 may be present in embodiments. When present, diagnoser 260 and/or diagnoser 394 is/are configured to diagnose faults indicated by analyzer 258. Diagnoser 260 and/or diagnoser 394 may analyze faults indicated by analyzer 258 and/or analyzer 392 and associated state information collected by collector 256 to determine/identify and indicate one or more causes (e.g., root causes) of one or multiple faults and/or indicate one or more suggested actions/remedies to avoid the faults (e.g., correct hardware, firmware, and/or software). In some examples, diagnoser 164 and/or diagnoser 394, alone or in combination with analyzer 258 and/or analyzer 392, includes one or more of the following: a crash detector and analyzer, a banged device detector, a missing device detector, a disk corruption detector, a network connectivity checker, and/or a system sleep health evaluator.

Figure 5:
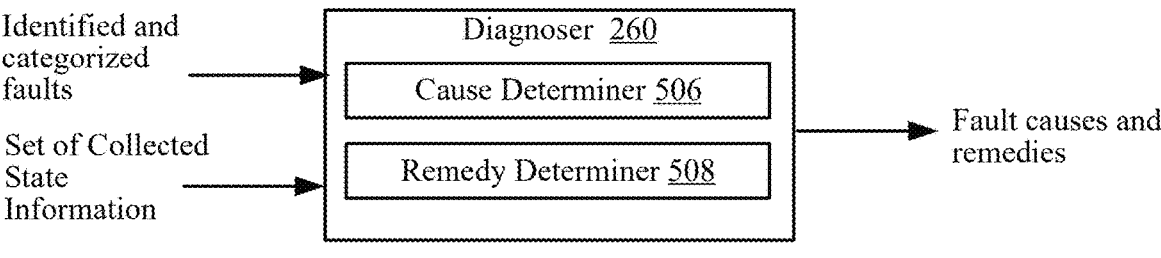
FIG. 5 illustrates a block diagram showing an example of a fault diagnoser, according to an embodiment.

FIG. 5 illustrates a block diagram showing an example of diagnoser 260 of FIG. 2, according to an embodiment. As shown in FIG. 5, diagnoser 160 includes a cause determiner 506 and a remedy determiner 508. Note that diagnoser 394 of FIG. 3 may be similarly configured to diagnoser 160 of FIG. 5. Cause determiner 506 is configured to determine one or more causes (e.g., sources) of faults in the identified and categorized faults. Cause determiner 506 may utilize the set of collected state information as a context to determine one or more likely sources of faults. Remedy determiner 508 is configured to determine and identify (e.g., suggest) one or more remedies, such as modifications to the source(s) of the faults and/or operational avoidance of the fault(s). Diagnoser 160 may generate the fault causes and remedies, e.g., for a report to server(s) 180.

With reference back to FIGS. 2 and 3, one or both of impact projectors 262 and 396 may be present in embodiments. When present, projector 262 and/or projector 396 is/are an impact projector configured to project an impact of each identified fault on a user, for example, if the user were to actually experience the fault(s). For example, a recurring fault that would repeatedly interrupt a user's use of computing device 102 may be prioritized for correction over a fault that occurred once unbeknownst to (e.g., without interrupting) a user.

One or both of prioritizer 264 and 398 may be present in embodiments. When present, prioritizer 264 and/or prioritizer 398 is/are configured to prioritize correction of the faults detected by analyzer 258 or diagnosed by diagnoser 260 and/or diagnoser 394. In some examples, prioritizer 264 and/or prioritizer 393 are configured to prioritize correction of the faults based on the projected impact determined by projector 262 and/or projector 396. Prioritizing (e.g., ranking) of detected faults has benefits, including enabling more significant faults to be prioritized higher for addressing relative to those of less significance.

Reporter 266 is configured to report the faults to a server for aggregation of faults from a plurality of DUTs. In some examples, reporter 266 can be configured to report (e.g., to server(s) 180 the state of computing device 102 while executing the workload interrupted by the power state transitions and/or after completion of the execution. In some examples, reporter 266 reports the state in a visual form understandable by users, such as users of client computing device(s) 126A-126N observing the reported states of computing devices 102A-102N via webapp GUI 384. Note that in an embodiment, a reporter 266 may additionally or alternatively be present at PST tester 182 of FIG. 3.

FIG. 6 illustrates a block diagram showing an example of reporter 266 of FIG. 2 parsing information for a report, according to an example embodiment. As shown in FIG. 6, reporter 266 includes a parser 610 to parse the set of collected state information, e.g., to reduce the volume of information uploaded to server(s) 180. Parser 610 may use information generated by analyzer 258 (and/or analyzer 392) and/or diagnoser 260 (and/or diagnoser 394), such as fault identification, categorization, causation, remedies, etc., to determine which state information to keep and/or discard for a report. For example, state information determined to be relevant to a detected fault may be reported while irrelevant information may be discarded and not reported. Parser 610 may be configured to go through collected logs and place useful information in context (e.g., with headers) in a database for display in a user interface (e.g., GUI 384). Reporter 266 may provide in a report (e.g., to server(s) 180) the parsed state information with the identified and categorized faults generated by analyzer 258 and fault causes and remedies generated by diagnoser 260.

In some examples, e.g., as shown in FIG. 1 by server(s) 180 storing and/or executing PST tester 182, a configuration may be created on or uploaded to server(s) 180. For example, server(s) 180 may execute PST tester 182 and provide a user interface (e.g., a GUI) to one or more users (e.g., test engineers) via a web app displayed using a browser application executed by a respective client computing devices 126A-126N. The user(s) of client computing device(s) 126A-126N can create one or more workload and power state transition configuration files for computing devices 102A-102N using PST tester 182. In some examples, PST tester 182 includes one or more components configurable to test the operation of computing device 102 using a workload and a sequence of power state transitions. An example of PST tester 182 is shown in FIG. 3.

As mentioned, PST tester 182 may be implemented on server(s) 180, and includes aggregator 390, for example, to aggregate the states collected and reported by each computing device 102A-102N for their respective executions of the workload during power state transitions. Aggregated reports indicating identified and categorized faults, fault causes and remedies, and a reduced set of state information from multiple computing devices 102A-102N provides PST tester 182 (e.g., analyzer 392, diagnoser 394, projector 396, and prioritizer 398) with a larger data set and a broadened analysis perspective (relative to PST tester 150 of FIG. 2), which may yield more accurate test results (e.g., due to providing a set of results derived from multiple computing device), and fault correction priorities (e.g., by providing prioritized/ranked results).

In some examples, such as if users of client computing devices 126A-126N use configurer 386 displayed by GUI 384 to create workload and PST configuration 148, initiator 388 may be configured to download (e.g., push) the respective workload and PST configurations 148 to computing devices 102A-102N. Initiator 388 may send a remote command to each computing device 102A-102N to launch operation (e.g., run) based on the configured workload and power state transition configurations.

In an example, PST tester 150 and/or 182 may be used to generate workload and PST configuration 148 as an XML configuration, e.g., a set of parameters defined in an XML file. The file may have various names but may be referred to herein as an XML configuration file, a configuration file, or PST file. The PST file may implement all or a portion of PST tester 150 and/or 182, such as one or more components shown in FIGS. 2 and 3. The following syntax is presented as one of many possible examples. Syntax may vary among examples applicable to one or more platforms (e.g., form factors) and/or configurations of computing devices 102A-102N.

A RunApps Section of the PST file may be used to extend built-in functionality. The RunApps section provides a way of calling additional external scripts/files/executables that can run within or alongside PST to provide enhanced functionality and logging.

A Test Run may refer to one complete testing cycle moving through an entire test sequence defined in the PST file (e.g., XML Configuration File).

A Session may refer to a single power state transition (e.g., and subsequent validations). A session may be described by two numbers. A first number may indicate a cycle in the XML (outer loop) and a second number may indicate a Loop Count (Inner Loop).

Simulated Battery (Simbat) may be used to simulate computing device 102 running as if on battery power, even though the PS 104 may be physically connected to a power source.

A (e.g., first) section in the workflow and PST configuration 148 may indicate/control how the test will flow through the defined power states, which may be described with the use of two levels of loops. The first loop may be defined by a field Cycles, which indicates the number of the times PST will run through all of the defined flow of power states. Following cycles is the main flow, which can include individual power states and/or loops of power states. An individual power state can be set to run with an entry Repeat, which sets the number of times the power state will be entered sequentially. Each time a power state is entered and exited, PST tester 150 and/or PST tester 182 may run the defined set of checks. An entry loops can be created to repeat different test flows.

Each defined power state can expose a number of options that can be configured. There may be common options for multiple power states and/r state-specific options. For example, common options for multiple (e.g., all) power states may include one or more of the following: ErrorEvt-Log: (e.g., turn on/off checking for errors in event logs following the state); CPUUtilLog (e.g., turn on/off logging the CPU utilization for the state); BangedDevicesLog (e.g., turn on/off checking/logging banged out device for the state); MissingDevicesLog (e.g., turn on/off checking/logging missing devices for the state); PingTestLog (e.g., turn on/off checking for a network ping for the power state).

Some power states may have state-specific options (e.g., fields) that may be defined. Test options include various options and features that can turned on/off to control which actions are performed during the test in between power states.

WaitTimeAfterWakeup may be used to indicate an amount of time (e.g., in seconds) after waking that PST tester 150 and/or 182 may wait before starting any other checks or actions. A default value may be, for example, 30 seconds.

WaitDurationBetweenCycles may be used to indicate an additional delay (e.g., in seconds) to add time between power state cycles. A default value may be, for example, 15 seconds.

HaltOnFail may be used to indicate whether PST tester 150 and/or 182 should halt execution when a failure is found.

DrainRate may be used to indicate a power drain rate limit. For example, if the drain rate in a CS state exceeds the drainrate value, a failure is listed in a CS_Log. The Value may vary per platform.

SWDripsMin may be used to indicate a minimum target for SWDrips. For example, if SWDrips in a CS session is lower than the SWDripsMin value, a failure is listed in a CS_Log. A default value may be, for example, 95%.

HWDripsMin may be used to indicate a minimum target for HWDrips. For example, if HWDrips in a CS session is lower than HWDripsMin, a failure is listed in CS_Log. A default value may be, for example, 95%.

SleepStudyDuration may be used to indicate a number of days of sleep data to collect. A default value may be, for example, 10 days.

TouchFWLog may be used to enable running a touch FW logging application.

ChkDskCorruptionLog may be used to enable checking for disk corruption after each power state.

TestParam may be used to indicate the test used to test one or more computing devices 102A-102N. TestParam may be saved with the results to provide an identifier for a test run. In examples, the same TestParam may be used for a set of computing devices 102A-102N to indicate the devices are a pool of DUTs all running the same test. For example, a default value may be: PSTCoreTesting.

PingTestURL may be used to indicate a uniform resource locator (URL) used by the ping test. The value may be adjusted, for example, depending on the network environment (e.g., regional restrictions, firewall, etc.).

CopyLogs2Share may be used to indicate whether PST tester 150 and/or 182 should upload test result logs to a provided location in between cycles, which may help collect data in a common location and provide a way to monitor testing status external to computing devices 102A-102N.

Select2Copy may be used to Enable or Disable the log upload.

Location may be used to indicate a path to a network storage location. Logs may be placed in a folder with a name matching the name used in the local test results folder.

Username may be used to indicate a username for access to the network location.

Password may be used to indicate a password for access to the network location. Leave blank if no credentials are required.

MemoryDump may be used to indicate settings for how to handle memory dumps generated by the workload and PST test.

Upload may be used to indicate whether to upload dumps to a specified network share.

Compress may be used to indicate whether to compress the dump. Compression may help minimize disk space used and network usage for uploading.

DeleteSource may be used to indicate whether to delete the original .dmp file after compressing or uploading. An original may not be deleted, for example, if it has not been compressed or uploaded.

DeleteCompressedFile may be used to indicate whether to delete the compressed .zip file after uploading. A file may not be deleted, for example, if it has not been uploaded.

AnalysisScript may be used to indicate a file that includes a debugger script to be used. The file can be placed in the root directory for PST. Leaving the element empty may prevent execution of the script, skipping the analysis portion, but the dump preservation may still be executed, e.g., if enabled. The script may end with a Q for debugger quitting. If the Q is not present, the script may stay in the debugger, which may be a desirable behavior if the run stops on BSOD analysis, leaving the debugger ready to go.

SyncFolderOptions may be used to indicate a comma separated list of string patterns to be excluded from the upload. By default, the list may include (e.g., all) signatures for Dump files, e.g., to prevent very large files from being unloaded unexpectedly.

A RunApps section of the configuration file may include test configurations packaged with PST tester 150 and/or 182. One or more configurations may be packaged with PST tester 150 and/or 182, e.g., by default. Test configurations can be found in the XML folder within the test directory for PST tester 150 and/or 182.

For example, TestConfig_Standard may execute a standard PST configuration.

TestConfig_NoChkDsk may execute the standard configuration while disabling the chkdsk feature, which may be used if/when there are issues detected by chkdsk preventing execution of the test.

TestConfig_ChkDsk_Workaround may be similar to TestConfig_NoChkDsk, but instead of disabling the check altogether uses a workaround to avoid false failures and does not block the test when failures occur.

TestConfig_Legacy may run a legacy PST test user model with a direct Hibernate state.

PST tester 150 and/or 182 can be configured to do many different tests. A standard configuration may be used based on achieving one or more goals of many PST workload tests, such as evaluating the stability of computing devices 102A-102N across supported power states.

A test flow may define/use an inner loop to define a period (e.g., a "Day") for workload over PST testing. As an example, a test may define a flow for each period (e.g., day). The flow may be, for example, a number of (e.g., two) CS sessions followed by a number of (e.g., one) AdaptiveHibernate (CS+Hibernate), followed by a number of (e.g., one) more CS sessions, and then a number of (e.g., one) more AdaptiveHibernate. The period flow may repeat for a number of (e.g., seven) days to form a longer period (e.g., a week). Each longer period (e.g., a week) may be ended, for example, by a number of (e.g., one) Direct Hibernate and a Reboot. A test may run for a period, such as a number of (e.g., two) cycles (e.g., two weeks).

PST tester 150 and/or 182, using workload and PST configuration 148, can capture crashes of various types. The test configuration may indicate the types of crashes that can be detected and how PST tester 150 and/or 182 may handle them.

For example, a Crash with Online Dump may be handled by collecting the generated dump file, with an analysis to find out what kind of crash it is. The dump may be moved as specified by workload and PST configuration 148. An Analysis.txt file may be produced in the test results folder. A crash with an online dump may be logged as a CRASH in the crash report.

A Crash without a Dump File may be handled (e.g., by the configured workload and PST test indicated by workload and PST configuration 148) by finding the event log entry for the crash to determine the bugcheck ID, which may be logged in the crash report. A crash without a dump file may occur when the crash itself causes the system to not be able to produce the dump. A crash without a dump file may be logged as a CRASH in the crash report.

A Crash with an Offline Dump may be detected using event logs. The dump may be extracted from the raw memory partition. The dump may be saved as specified by the configuration 148. A crash with an offline dump may be logged as a SOC_RESET in the crash report.

A User Initiated Crash may be handled similar to online/offline dumps (depending on system). A user initiated crash may be logged as a FORCED_REBOOT in the crash report. A user initiated crash may be implemented, for example, by a long power button press (1C8) or a keyboard initiated (E2) crash.

An Unexpected reboot may be any unplanned reboot, for which there is no evidence of a logged crash. An unexpected reboot may be caused by a user initiated reboot during a workload PST test, or a reboot due to WU for a long running test. An unexpected reboot may be logged as UNDEFINED in the crash report.

Workload and PST configuration 148 may indicate a simulated battery on the system so that computing device(s)

102 can run as if on battery power even when plugged in. Running on battery power may be used to provide relevant low power state information when in CS and Hibernate states. Using a simulated battery allows for long running tests without the need for sophisticated external power control. Simulated batteries impact the OS/driver level of functionality. Any underlying systems (such as SAM) may still behave as if running on AC power. Simulated battery tests may supplement test runs on Real Battery.

There may be multiple implementations of Simulated Battery implemented by PST tester 150 and/or 182. A first type of simulated battery may emulate a real battery (e.g., by accounting for device-specific features). A second simulated battery may be a generic implementation of a simulated battery that works across multiple types of computing devices 102.

Simulated battery may be disabled when running on real batteries or collecting data for an AC power scenario.

A "runapps" section of workload and PST configuration 148 may allow almost anything to be called during each power state transition, which allows PST tester 150 and/or 182 to be extended in many ways to capture more data, create new stimuli, or run other types of debugging during the course of the test. In some examples, an application/script can run at the start or end of a workload PST test to perform any test setup or cleanup steps.

The runapps feature may be used through an XML config file (e.g., workload and PST configuration 148) associated with PST tester 150 and/or 182. For example, the XML file may be stored in a directory (e.g., "C:\PST\XML") in computing devices 102A-102N. Within the XML there may be a node called <RunApps>. Inside the RunApps node a user can adapt or customize PST testing by specifying various applications to run (e.g., in addition to standard or default operations).

RunApps may include anything that can be run via a command, such as applications (e.g., .exe files) and scripts (e.g., bat, cmd, ps1). A powershell script may be wrapped in a bat/cmd script.

A PSTAddon directory may be a script where a user can pick and choose to simulate user scenarios across different applications in an OS, such as interactions with WiFi, Bluetooth, USB, a storage drive, an email application, etc. A user of PST tester 150 and/or 182 can specify calls to individual applications in the PSTAddon directory with the naming convention PST"Application Name".bat.

A PSTAddon folder may include user scenarios for different operating system applications. Various scenarios may be implemented for each application. A user can create a custom list of scenarios to include in their Runapps Feature. Individual methods are commented and provide context.

Halt on fail provides a way to stop a workload PST test running when a failure occurs. Workload and PST configuration 148 may configure a halt on one or more specific failure types, e.g., to target a specific issue. By halting the test, the issue may be preserved for further debugging. A configuration of HaltOnFail may be specified, for example, in the file "HaltOnFailConfig.txt," while file may be in the root of the tool (C:\PST\). Each type of failure may be enumerated in the file.

A type of failure includes missing devices. There may be instances where a missing device may be expected, such as with virtual devices that may not always be present on the system. A second configuration file (e.g., "MonitorMissingDevs.txt") may be used when halting on missing devices. The file may be located with the HaltOnFailConfig file. The file may provide a list of devices that can be looked for as missing, resulting in a halt when missing. Devices can be added to a list of default devices, for example, by creating a new line and providing the device name (e.g., as may be found in an operating system device manager).

A file (e.g., GlobalParameters.XML) may be provided in addition to the test configuration XML. The file may be used to differentiate unique platforms. The fields may not change the way the workload PST test is executed like the workload and PST configuration does but may indicate to PST tester 150 and/or 182 how to interact with the computing device 102 that the workload PST test is running on.

A file (e.g., DevicesFilter.xml) may allow for filtering of banged and missing devices that may be expected to fail, such as software (SW)-based devices that may be known to come and go through system transitions.

A workload PST test running based on workload and PST configuration 148 may create a variety of different log files while executing. A workload PST test run may save the results in a specified location in memory (e.g., C:\PST\TestResults\<DeviceName>_<StartDate>_ <StartTime>). Examples of files produced are described below.

PSTResults.XMLmay include an aggregate of the results for a workload PST test run. The file may include (e.g., in order) the information describing the test being run, the device the test is running on, a summary of the high impact issues (e.g., Crashes, Banged Devices, Missing Devices), Summary of test run parametrics, and/or a session by session breakdown for each power state transition. The XML file may be the formatted result of serializing a common object of type TestReport. The data can be parsed back into a TestReport object, for example, by utilizing "PSTReporting.dll."

PSTtrace.txt may be created in the Trace folder of the test results. The file may provide a trace of output from the tool during execution, which may be helpful for debugging.

TouchTrace.txt may be created in the Trace folder of the test results. The file may provide a trace of output from a touch tool, which may be helpful for debugging.

VersionInformation.txt may be a report generated by the script specified by versionReportPath. The file may be created if the system includes a version report tool.

TestCompleted.txt may be produced upon test completion, which may be useful if/when using automation to determine test termination.

SleepStudy.html may be created through powercfg to show the sleep health of computing devices 102A-102N in an html format, e.g., to provide a visual way of checking the sleep health.

SleepStudy.XML may be created through powercfg. The file may include the data in the HTML file in a format to consume by automation. The file may be consumed, e.g., by PST tester 150 and/or 182 as a measure of sleep health of computing devices 102A-102N.

Sleepstudy-report_verbose may be an html formatted sleep study captured with verbose settings, which may be useful for diving deeper into sleep issues of computing devices 102A-102N.

EnableSimulatedBatteryLog.txt may log the setup and removal of simulated battery, which may be helpful in determining which simulated battery was used in a workload PST test.

SystemEventLogs.evtx may be an event log that includes "System" events.

AppEventLogs.evtx may be an event log that includes "Application" events.

SecurityEventLogs.evtx may be an event log that includes detected "Security" events.

DeviceInfo.csv may include information about computing device 102 being tested to help correlate failures to a particular configuration of hardware (HW).

ChkDskLog.csv may log the results of a chkdsk test that is run each cycle.

PingResults.csv may log the result of one or more (e.g., simple) ping tests.

CompPingResults.csv may log the results of a comprehensive ping test.

CS_Log.txt may be a trace file with information produced for each CS and AdaptiveHibernate Session, which may be helpful for debugging.

CStimelog.csv may log the amount of time the device spent in CS according to windows logs. CStimelog.csv may compare the time spent to an expected time based on a configuration. A failure and reason may be logged if/when issues are found.

S4TimeLog.csv may log the amount of time the device spent in hibernation according to operating system logs. Does not evaluate a pass/fail result RebootTimeLog.csv may log the amount of time spent rebooting each time there is a planned reboot. No pass/fail criteria.

DeviceAliveLog.csv may indicate a periodic entry to show computing device 102 is alive and the workload PST test is running, which may be useful for detecting device hangs.

PST tester 150 and/or 182 may use a shared object model for storing test data. The object may be de-serialized from TestResults.xml, e.g., to make parsing data easier for parser 610.

Note that the PST testers described above may operate in various ways. For instance, FIG. 7 shows a flowchart 700 for implementing a power state framework, according to an embodiment. PST tester 150 and/or PST tester 182 may operate in accordance with example flowchart 700. However, PST testers disclosed herein may operate according to other methods. Other structural and operational embodiments will be apparent to persons skilled in the relevant art(s) based on the foregoing discussion of flowchart 700. In various implementations, flowchart 700 may have additional steps, fewer steps, and/or may operate in alternative orders to that shown in FIG. 7. FIG. 7 is simply one of many possible embodiments. Flowchart 700 is described in further detail as follows.

As shown in FIG. 7, in step 702, a workload and a sequence of power state transitions are configured to be executed by a computing device. The workload represents a simulation of user interaction with the computing device over a time period. The sequence of power state transitions represents a simulation of power state transitions of the computing device that interrupt execution of the workload by the computing device over the time period. For example, as shown in FIGS. 1-6, each computing device 102A-102N is configured with a respective workload and PST configuration 148, e.g., using PST tester 150 (e.g., configurer 252) and/or PST tester 182 (e.g., configurer 386) to select, create, edit, and/or download workload and PST configuration 148.

In step 704, execution of the workload and the sequence of power state transitions by the computing device is initiated. For example, as shown in FIGS. 1-6, PST tester 150 (e.g., initiator 254) and/or PST tester 182 (e.g., initiator 388) initiates execution of workload and PST configuration 148 by configured computing devices 102A-102N.

In step 706, a state of the computing device is collected during the execution of the workload and the sequence of power state transitions. For example, as shown in FIGS. 1-6, each instance of collector 256 in PST tester 150 executing on a computing device 102A-102N can collect a state of a computing device 102A-102N. For example, collector 256 may collect state information about a touch screen controller, external devices, network connectivity, sleep study-battery rundown state information, wired and wireless connectivity-network, Bluetooth, Wi-Fi, device power state changes, mouse, keyboard, monitor, banged out/missing devices, driver states, error codes. States may be collected before and after power state transitions so that states can be compared during analyses.

In step 708, the state of the computing device is analyzed to identify faults in the computing device. For example, as shown in FIGS. 1-6, each instance of analyzer 258 in PST tester 150 executed by a computing device 102A-102N and/or analyzer 392 in PST tester 182 executed by server(s) 182 can analyze the state information collected by collector 256 to identify faults in a single computing device 102 and/or to identify faults across multiple computing devices 102A-102N.

In step 710, an impact of each of the faults on a user is projected as if the user were to experience the faults. For example, as shown in FIGS. 1-6, each instance of projector 262 in PST tester 150 executed by a computing device 102A-102N and/or projector 396 in PST tester 182 executed by server(s) 180 can project an impact on respective user(s) of computing devices 102A-102N for each identified fault.

In step 712, correction of the faults is prioritized based on the projected impact. For example, as shown in FIGS. 1-6, each instance of prioritizer 264 in PST tester 150 executed by a computing device 102A-102N and/or prioritizer 398 executed by server(s) 180 can prioritize correction of each identified fault.

III. Example Computing Device Embodiments

Workload and PST configuration 148, PST tester 150, PST tester 182, configurer 252, initiator 254, collector 256, analyzer 258, diagnoser 260, projector 262, prioritizer 264, reporter 266, GUI 384, configurer 386, initiator 388, aggregator 390, analyzer 392, diagnoser 394, projector 396, prioritizer 398, fault identifier 402, fault categorizer 404, cause determiner 506, remedy determiner 508, parser 610, and flowchart 700 are each implementable as computer program code/instructions configured to be executed in one or more processors and stored in a computer readable storage medium. Alternatively, workload and PST configuration 148, PST tester 150, PST tester 182, configurer 252, initiator 254, collector 256, analyzer 258, diagnoser 260, projector 262, prioritizer 264, reporter 266, GUI 384, configurer 386, initiator 388, aggregator 390, analyzer 392, diagnoser 394, projector 396, prioritizer 398, fault identifier 402, fault categorizer 404, cause determiner 506, remedy determiner 508, parser 610, and flowchart 700 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 8:
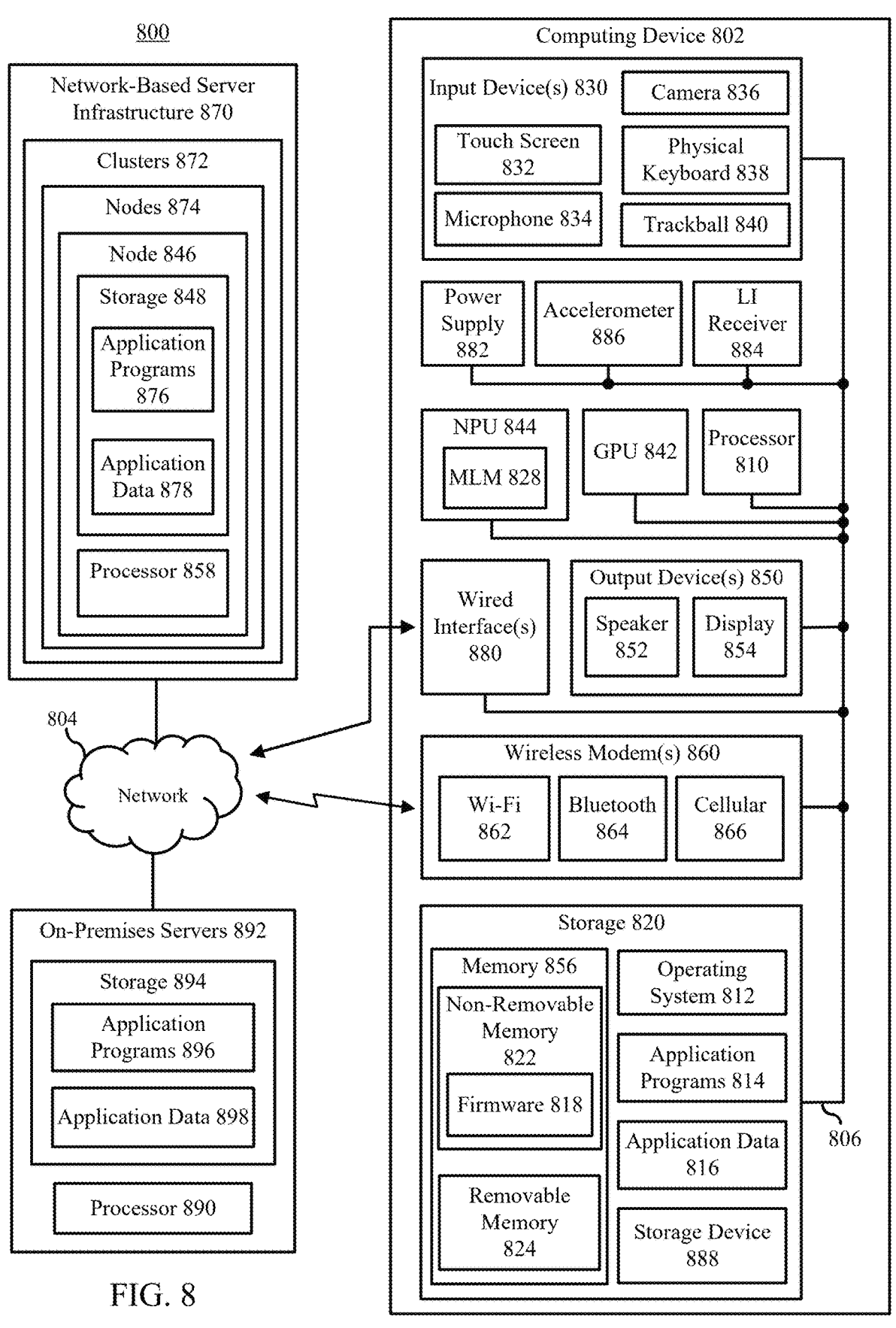
FIG. 8 shows a block diagram of an example computing device that may be used to implement example embodiments.

Embodiments disclosed herein can be implemented in one or more computing devices that are mobile (a mobile device)

and/or stationary (a stationary device) and include any combination of the features of such mobile and stationary computing devices. Examples of computing devices in which embodiments are implementable are described as follows with respect to FIG. 8. FIG. 8 shows a block diagram of an exemplary computing environment 800 that includes a computing device 802. Computing device 802 is an example of each of computing devices 102A-102N, client computing devices 126A-126N, and server(s) 180, which may each include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc. In examples, network 804 includes one or more wired and/or wireless portions. In some examples, network 804 additionally or alternatively includes a cellular network for cellular communications. Computing device 802 is described in detail as follows.

Computing device 802 is any of a variety of types of computing devices. Examples of computing device 802 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 802 is a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, a graphics processing unit (GPU) 842, a neural processing unit (NPU) 844, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 888. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device (s) 830 includes a touch screen 832, a microphone 834, a camera 836, a physical keyboard 838, and a trackball 840. Not all components of computing device 802 shown in FIG. 8 are present in all embodiments, additional components not shown may be present, and in a particular embodiment any combination of the components are present. In examples, components of computing device 802 are mounted to a circuit card (e.g., a motherboard) of computing device 802, integrated in a housing of computing device 802, or otherwise included in computing device 802. The components of computing device 802 are described as follows.

In embodiments, a single processor 810 (e.g., central processing unit (CPU), microcontroller, a microprocessor, signal processor, ASIC (application specific integrated circuit), and/or other physical hardware processor circuit) or multiple processors 810 are present in computing device 802 for performing such tasks as program execution, signal coding, data processing, input/output processing, power control, and/or other functions. In examples, processor 810 is a single-core or multi-core processor, and each processor core is single-threaded or multithreaded (to provide multiple threads of execution concurrently). Processor 810 is configured to execute program code stored in a computer readable medium, such as program code of operating system 812 and application programs 814 stored in storage 820. The program code is structured to cause processor 810 to perform operations, including the processes/methods disclosed herein. Operating system 812 controls the allocation and usage of the components of computing device 802 and provides support for one or more application programs 814 (also referred to as "applications" or "apps"). In examples, application programs 814 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 810 includes one or more general processors (e.g., CPUs) configured with or coupled to one or more hardware accelerators, such as one or more NPUs 844 and/or one or more GPUs 842.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) present to communicatively couple processor 810 to various other components of computing device 802, although in other embodiments, an alternative bus, further buses, and/or one or more individual signal lines is/are present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 888, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 822 includes main memory and is separate from or fabricated in a same integrated circuit as processor 810. As shown in FIG. 8, non-removable memory 822 stores firmware 818 that is present to provide low-level control of hardware. Examples of firmware 818 include BIOS (Basic Input/Output System, such as on personal computers) and boot firmware (e.g., on smart phones). In examples, removable memory 824 is inserted into a receptacle of or is otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 888 are present that are internal and/or external to a housing of computing device 802 and are or are not removable. Examples of storage device 888 include a hard disk drive, a SSD, a thumb drive (e.g., a USB (Universal Serial Bus) flash drive), or other physical storage device.

One or more programs are stored in storage 820. Such programs include operating system 812, one or more application programs 814, and other program modules and program data. Examples of such application programs include computer program logic (e.g., computer program code/instructions) for implementing workload and PST configuration 148, PST tester 150, PST tester 182, configurer 252, initiator 254, collector 256, analyzer 258, diagnoser 260, projector 262, prioritizer 264, reporter 266, GUI 384, configurer 386, initiator 388, aggregator 390, analyzer 392, diagnoser 394, projector 396, prioritizer 398, fault identifier 402, fault categorizer 404, cause determiner 506, remedy determiner 508, parser 610, and flowchart 700 (and/or any individual steps thereof).

Storage 820 also stores data used and/or generated by operating system 812 and application programs 814 as application data 816. Examples of application data 816 include web pages, text, images, tables, sound files, video data, and other data. In examples, application data 816 is sent to and/or received from one or more network servers or other devices via one or more wired or wireless networks. Storage 820 is used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 802 through one or more input devices 830 and receives information from computing device 802 through one or more output devices 850. Input device(s) 830 includes one or more of touch screen 832, microphone 834, camera 836, physical keyboard 838 and/or trackball 840 and output device(s) 850 includes one or more of speaker 852 and display 854. Each of input device(s) 830 and output device(s) 850 are integral to computing device 802 (e.g., built into a housing of computing device 802) or are external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 displays information, as well as operating as touch screen 832 by receiving user commands and/or other information (e.g., by touch, finger gestures, virtual keyboard, etc.) as a user interface. Any number of each type of input device(s) 830 and output device(s) 850 are present, including multiple microphones 834, multiple cameras 836, multiple speakers 852, and/or multiple displays 854.

In embodiments where GPU 842 is present, GPU 842 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 842 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 844 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 828. In an example, NPU 844 is configured for a data-driven parallel computing and is highly efficient at processing massive multimedia data such as videos and images and processing data for neural networks. NPU 844 is configured for efficient handling of AI-related tasks, such as speech recognition, background blurring in video calls, photo or video editing processes like object detection, etc.

In embodiments disclosed herein that implement ML models, NPU 844 can be utilized to execute such ML models, of which MLM 828 is an example. For instance, where applicable, MLM 828 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 844 is used to train MLM 828. To train MLM 828, training data is that includes input features (attributes) and their corresponding output labels/ target values (e.g., for supervised learning) is collected. A training algorithm is a computational procedure that is used so that MLM 828 learns from the training data. Examples of training inputs for ML model training include user position, angle, gesture, time of day, location, user crypto, etc. Parameters/weights are internal settings of MLM 828 that are adjusted during training by the training algorithm to reduce a difference between predictions by MLM 828 and actual outcomes (e.g., output labels). In some examples, MLM 828 is set with initial values for the parameters/weights. A loss function measures a dissimilarity between predictions by MLM 828 and the target values, and the parameters/weights of MLM 828 are adjusted to minimize the loss function. The parameters/weights are iteratively adjusted by an optimization technique, such as gradient descent. In this manner, MLM 828 is generated through training by NPU 844 to be used to generate inferences based on received input feature sets for particular applications. MLM 828 is generated as a computer program or other type of algorithm configured to generate an output (e.g., a classification, a prediction/inference) based on received input features and is stored in the form of a file or other data structure.

In examples, such training of MLM 828 by NPU 844 is supervised or unsupervised. According to supervised learning, input objects (e.g., a vector of predictor variables) and a desired output value (e.g., a human-labeled supervisory signal) train MLM 828. The training data is processed, building a function that maps new data on expected output values. Example algorithms usable by NPU 844 to perform supervised training of MLM 828 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 828 is an LLM, MLM 828 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 828 is trained to learn patterns from unlabeled data. For instance, in embodiments where MLM 828 implements unsupervised learning techniques, MLM 828 identifies one or more classifications or clusters to which an input belongs. During a training phase of MLM 828 according to unsupervised learning, MLM 828 tries to mimic the provided training data and uses the error in its mimicked output to correct itself (i.e., correct weights and biases). In further examples, NPU 844 perform unsupervised training of MLM 828 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and back-propagating reconstruction errors or hidden state reparameterizations.

Note that NPU 844 need not necessarily be present in all ML model embodiments. In embodiments where ML models are present, any one or more of processor 810, GPU 842, and/or NPU 844 can be present to train and/or execute MLM 828.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). In examples, wireless modem 860 also or alternatively includes other radio-based modem types, such as a Bluetooth modem 864 (also referred to as a "Bluetooth device") and/or Wi-Fi modem 862 (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and receives power from a battery internal to computing device 802, and/or from a power cord plugged into a power port of computing device 802 (e.g., a USB port, an A/C power port). LI receiver 884 is useable for location determination of computing device 802 and in examples includes a satellite navigation receiver such as a Global Positioning System (GPS) receiver and/or includes other type of location determiner configured to determine location of computing device 802 based on received information (e.g., using cell tower triangulation, etc.). Accelerometer 886, when present, is configured to determine an orientation of computing device 802.

Note that the illustrated components of computing device 802 are not required or all-inclusive, and fewer or greater numbers of components can be present as would be recognized by one skilled in the art. In examples, computing device 802 includes one or more of a gyroscope, barometer, proximity sensor, ambient light sensor, digital compass, etc. In an example, processor 810 and memory 856 are co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein is stored in storage 820 and executed by processor 810.

In some embodiments, server infrastructure 870 is present in computing environment 800 and is communicatively coupled with computing device 802 via network 804. Server infrastructure 870, when present, is a network-accessible server set (e.g., a cloud-based environment or platform). As shown in FIG. 8, server infrastructure 870 includes clusters 872. Each of clusters 872 comprises a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. In examples, any of nodes 874 is a storage node that comprises a plurality of physical storage disks, SSDs, and/or other physical storage devices that are accessible via network 804 and are configured to store data associated with the applications and services managed by nodes 874.

Each of nodes 874, as a compute node, comprises one or more server computers, server systems, and/or computing devices. For instance, a node 874 in accordance with an embodiment includes one or more of the components of computing device 802 disclosed herein. Each of nodes 874 is configured to execute one or more software applications (or "applications") and/or services and/or manage hardware resources (e.g., processors, memory, etc.), which are utilized by users (e.g., customers) of the network-accessible server set. In examples, as shown in FIG. 8, nodes 874 includes a node 846 that includes storage 848 and/or one or more of a processor 858 (e.g., similar to processor 810, GPU 842, and/or NPU 844 of computing device 802). Storage 848 stores application programs 876 and application data 878. Processor(s) 858 operate application programs 876 which access and/or generate related application data 878. In an implementation, nodes such as node 846 of nodes 874 operate or comprise one or more virtual machines, with each virtual machine emulating a system architecture (e.g., an operating system), in an isolated manner, upon which applications such as application programs 876 are executed.

In embodiments, one or more of clusters 872 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 872 are included in a datacenter in a distributed collection of datacenters. In embodiments, exemplary computing environment 800 comprises part of a cloud-based platform.

In an embodiment, computing device 802 accesses application programs 876 for execution in any manner, such as by a client application and/or a browser at computing device 802.

In an example, for purposes of network (e.g., cloud) backup and data security, computing device 802 additionally and/or alternatively synchronizes copies of application programs 814 and/or application data 816 to be stored at network-based server infrastructure 870 as application programs 876 and/or application data 878. In examples, operating system 812 and/or application programs 814 include a file hosting service client configured to synchronize applications and/or data stored in storage 820 at network-based server infrastructure 870.

In some embodiments, on-premises servers 892 are present in computing environment 800 and are communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 can be shared by on-premises servers 892 between computing devices of the organization, including computing device 802 (when part of an organization) through a local network of the organization, and/or through further networks accessible to the organization (including the Internet). Furthermore, in examples, on-premises servers 892 serve applications such as application programs 896 to the computing devices of the organization, including computing device 802. Accordingly, in examples, on-premises servers 892 include storage 894 (which includes one or more physical storage devices such as storage disks and/or SSDs) for storage of application programs 896 and application data 898 and include a processor 890 (e.g., similar to processor 810, GPU 842, and/or NPU 844 of computing device 802) for execution of application programs 896. In some embodiments, multiple processors 890 are present for execution of application programs 896 and/or for other purposes. In further examples, computing device 802 is configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 is used to implement systems, clients, or devices, or components/subcomponents thereof, disclosed elsewhere herein. In other embodiments, a combination of computing device 802, network-based server infrastructure 870, and/or on-premises servers 892 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) are stored in storage 820. Such computer programs can also be received via wired interface(s) 860 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Further Example Embodiments

Methods, systems and computer program products are provided for a power state framework that executes a configured workload in a variety of supported computing device types and configurations during a configured sequence of power state transitions to simulate user experiences. Workloads can be combined, such as a default workload combined with an add-on custom workload. The automated workloads and power transitions are implemented on one or more devices serially, concurrently, locally, remotely, in the same or different locations. States of each device are monitored, collected, reported, and analyzed to identify faults, which are prioritized for repair, for example, based on the projected impact of the faults on users, e.g., if the users were to experience the faults. The state of the computing device includes states of attached peripheral devices and wireless or wired connectivity before and after power state transitions. Device states indicate device stability throughout supported device power state transitions. Devices under test can be on debuggers during execution of workload and power state transitions. Automated, accelerated simulation of the execution of end user workloads and power state transitions in actual computing devices saves time and avoids replication errors compared to manual human driven device testing. Automated (e.g., remote, customizable) testing can provide confirmation of performance and compatibility prior to computing device procurement.

In one aspect, a computing device comprises: a workload initiator configured to initiate execution of a workload by a computing device under test (DUT), the workload representing a simulation of user interaction with the DUT over a time period; a power state transitioner configured to initiate execution of a sequence of power state transitions by the DUT during the execution of the workload by the DUT, the power state transitions representing a simulation of power state transitions of the DUT that interrupt the execution of the workload over the time period; a state collector configured to collect a state of the DUT during the execution of the workload and the sequence of power state transitions; an analyzer configured to analyze the state of the DUT to identify faults in the DUT; and a reporter configured to report the faults for correction.

In examples, the computing device comprises the DUT.

In examples, the computing further comprises a reporter configured to report the faults to a server for aggregation of faults from a plurality of DUTs.

In examples, the computing further comprises an impact projector configured to project an impact of each of the faults on a user if the user were to experience the faults. The prioritizer may be configured to prioritize correction of the faults based on the projected impact.

In examples, the computing further comprises a configurer configured to configure the workload and the sequence of power state transitions based, at least in part, on at least one of a DUT type among a plurality of supported device types or a DUT configuration among a plurality of supported DUT configurations.

In examples, the workload initiator initiates execution of the workload by a plurality of DUTs. The power state transitioner may be configured to initiate execution of the sequence of power state transitions by the plurality of DUTs In examples, the plurality of DUTs comprises at least one of different DUT types or different DUT configurations.

In examples, the workload is configured with at least one halt on fail trigger to stop execution of the workload upon detection of a fault by the analyzer.

In examples, the workload includes separate combined workloads (e.g., a default workload and a customized or add-on workload).

In examples, the state of the computing device includes states of peripheral devices attached to the DUT and connectivity of the DUT before and after at least one of the power state transitions.

In examples, the analyzer is configured to analyze the state of the DUT in aggregation to determine a root cause of multiple faults.

In examples, the DUT is on a debugger during execution of the workload and the power state transitions.

In another aspect, a method comprises configuring a workload and a sequence of power state transitions to be executed by a computing device, the workload representing a simulation of user interaction with the computing device over a time period, and the sequence of power state transitions representing a simulation of power state transitions of the computing device that interrupt execution of the workload by the computing device over the time period; initiating execution of the workload and the sequence of power state transitions by the computing device; collecting a state of the computing device during the execution of the workload and the sequence of power state transitions; analyzing the state of the computing device to identify faults in the computing device; projecting an impact of each of the faults on a user if the user were to experience the faults; and prioritizing correction of the faults based on the projected impact.

In examples, the configuration of the workload and the sequence of power state transitions is based, at least in part, on at least one of a type of the computing device among a plurality of supported types of computing devices or a configuration of the computing device among a plurality of supported configurations.

In examples, the method further comprises initiating execution of the workload and the sequence of power state transitions by a plurality of computing devices, including the computing device.

In examples, the plurality of computing devices comprises at least two different types of computing devices or at least two different configurations.

In examples, the workload includes separate combined workloads (e.g., a default workload and a customized or add-on workload).

In examples, the state of the computing device includes states of peripheral devices attached to the DUT and connectivity of the DUT before and after at least one of the power state transitions.

In another aspect, a computer-readable storage medium may have program instructions recorded thereon that, when executed by a processing circuit, perform a method. The method may comprise providing a configuration of a workload and a sequence of power state transitions to be executed by a computing device. The workload represents a simulation of user interaction with the computing device over a time period. The sequence of power state transitions represents a simulation of power state transitions of the computing device that interrupt execution of the workload by the computing device over the time period. The method may (further) comprise providing an indication to initiate execution of the workload and the sequence of power state transitions by the computing device; receiving indications of a state of the computing device during the execution of the workload and the sequence of power state transitions; analyzing the state of the computing device to identify faults in the computing device; projecting an impact of each of the faults on a user if the user were to experience the faults; and prioritizing correction of the faults based on the projected impact.

In examples, the configuration of the workload and the sequence of power state transitions is based, at least in part, on at least one of a type of the computing device among a plurality of supported types of computing devices or a configuration of the computing device among a plurality of supported configurations.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the claimed embodiments as defined in the appended claims. Accordingly, the breadth and scope of the present embodiments should not be limited by any of the above-described exemplary embodiments, but should be defined only in accordance with the following claims and their equivalents.

What is claimed is:

1. A computing device comprising:

a processor; and memory storing programming instructions structured to cause the processor to:

initiate execution of a workload by a computing device under test (DUT) during execution of a sequence of power state transitions by the DUT during the execution of the workload by the DUT, the workload representing a simulation of user interaction with the DUT over a time period, the power state transitions representing a simulation of power state transitions of the DUT that interrupt the execution of the workload over the time period;

collect a state of the DUT during the execution of the workload and the sequence of power state transitions;

analyze the state of the DUT to identify faults in the DUT; and prioritize correction of the faults.

2. The computing device of claim 1, wherein the computing device comprises the DUT.

3. The computing device of claim 1, wherein the programming instructions are further structured to cause the processor to:

report the faults to a server for aggregation of faults from a plurality of DUTs.

4. The computing device of claim 1, wherein the programming instructions are further structured to cause the processor to:

project an impact of each of the faults on a user if the user were to experience the faults; and prioritize correction of the faults based on the projected impact.

5. The computing device of claim 1, wherein the programming instructions are further structured to cause the processor to:

configure the workload and the sequence of power state transitions based, at least in part, on at least one of a DUT type among a plurality of supported device types or a DUT configuration among a plurality of supported DUT configurations.

6. The computing device of claim 1, wherein the programming instructions are further structured to cause the processor to:

initiate execution of the workload by a plurality of DUTs; and initiate execution of the sequence of power state transitions by the plurality of DUTs.

7. The computing device of claim 6, wherein the plurality of DUTs comprises at least one of different DUT types or different DUT configurations.

8. The computing device of claim 1, wherein the workload is configured with at least one halt on fail trigger to stop execution of the workload upon detection of a fault.

9. The computing device of claim 1, wherein the workload includes separate combined workloads.

10. The computing device of claim 1, wherein the state of the computing device includes states of peripheral devices attached to the DUT and connectivity of the DUT before and after at least one of the power state transitions.

11. The computing device of claim 1, wherein the programming instructions are further structured to cause the processor to:

analyze the state of the DUT in aggregation to determine a root cause of multiple faults.

12. The computing device of claim 1, wherein the DUT is on a debugger during execution of the workload and the power state transitions.

13. A computer-implemented method comprising:

configuring a workload and a sequence of power state transitions to be executed by a computing device, the workload representing a simulation of user interaction with the computing device over a time period, and the sequence of power state transitions representing a simulation of power state transitions of the computing device that interrupt execution of the workload by the computing device over the time period;

initiating execution of the workload and the sequence of power state transitions by the computing device;

collecting a state of the computing device during the execution of the workload and the sequence of power state transitions;

analyzing the state of the computing device to identify faults in the computing device;

projecting an impact of each of the faults on a user if the user were to experience the faults; and prioritizing correction of the faults based on the projected impact.

14. The computer-implemented method of claim 13, wherein the configuration of the workload and the sequence of power state transitions is based, at least in part, on at least one of a type of the computing device among a plurality of supported types of computing devices or a configuration of the computing device among a plurality of supported configurations.

15. The computer-implemented method of claim 13, further comprising:

initiating execution of the workload and the sequence of power state transitions by a plurality of computing devices, including the computing device.

16. The computer-implemented method of claim 15, wherein the plurality of computing devices comprises at least two different types of computing devices or at least two different configurations.

17. The computer-implemented method of claim 13, wherein the workload includes separate combined workloads.

18. The computer-implemented method of claim 13, wherein the state of the computing device includes states of peripheral devices attached to a computing device under test (DUT) and connectivity of the DUT before and after at least one of the power state transitions.

19. A computer-readable storage medium having program instructions recorded thereon that, when executed by a processing circuit, perform a method comprising:

providing a configuration of a workload and a sequence of power state transitions to be executed by a computing device, the workload representing a simulation of user interaction with the computing device over a time period, and the sequence of power state transitions representing a simulation of power state transitions of the computing device that interrupt execution of the workload by the computing device over the time period;

providing an indication to initiate execution of the workload and the sequence of power state transitions by the computing device;

receiving indications of a state of the computing device during the execution of the workload and the sequence of power state transitions;

analyzing the state of the computing device to identify faults in the computing device;

projecting an impact of each of the faults on a user if the user were to experience the faults; and prioritizing correction of the faults based on the projected impact.

20. The computer-readable storage medium of claim 19, wherein the configuration of the workload and the sequence of power state transitions is based, at least in part, on at least one of a type of the computing device among a plurality of supported types of computing devices or a configuration of the computing device among a plurality of supported configurations.

* * * * *